(12) United States Patent
Bhorkar

(10) Patent No.: US 10,798,386 B2
(45) Date of Patent: Oct. 6, 2020

(54) VIDEO COMPRESSION WITH GENERATIVE MODELS

(71) Applicant: AT&T Intellectual Property I, L.P., Atlanta, GA (US)

(72) Inventor: Abhijeet Bhorkar, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/258,351

(22) Filed: Jan. 25, 2019

(65) Prior Publication Data

US 2020/0244969 A1 Jul. 30, 2020

(51) Int. Cl.
| | | |
|---|---|---|
| *G06N 3/08* | (2006.01) | |
| *G06N 3/02* | (2006.01) | |
| *H04N 19/149* | (2014.01) | |
| *H04N 19/137* | (2014.01) | |
| *H04N 19/176* | (2014.01) | |
| *G06N 3/04* | (2006.01) | |
| *H04N 19/147* | (2014.01) | |

(52) U.S. Cl.
CPC ......... *H04N 19/149* (2014.11); *G06N 3/0454* (2013.01); *G06N 3/088* (2013.01); *H04N 19/137* (2014.11); *H04N 19/147* (2014.11); *H04N 19/176* (2014.11)

(58) Field of Classification Search
CPC ........ H04N 19/124; G06T 7/254; G06N 3/02; G06N 3/08
USPC ............................... 375/240.26, 240, 240.12
See application file for complete search history.

(56) References Cited

U.S. PATENT DOCUMENTS

| | | | |
|---|---|---|---|
| 10,049,279 B2 | 8/2018 | Li et al. | |
| 10,089,742 B1 | 10/2018 | Lin et al. | |
| 10,382,799 B1 * | 8/2019 | Walters | G06T 7/254 |
| 2017/0228633 A1 | 8/2017 | Danihelka et al. | |
| 2017/0230675 A1 | 8/2017 | Wierstra et al. | |
| 2018/0033144 A1 | 2/2018 | Risman et al. | |
| 2018/0122048 A1 | 5/2018 | Wang et al. | |
| 2018/0137389 A1 | 5/2018 | Mathieu et al. | |

(Continued)

FOREIGN PATENT DOCUMENTS

CN 107123151 A 9/2017

OTHER PUBLICATIONS

Wang, Jiayu, et al. "Unregularized Auto-Encoder with Generative Adversarial Networks for Image Generation." 2018 ACM Multimedia Conference on Multimedia Conference. ACM, 2018.

(Continued)

*Primary Examiner* — Albert Kir

(57) ABSTRACT

A processing system having at least one processor may obtain a sequence of frames of a video, and detect a correlation between visual properties of a first frame of the sequence of frames and a second frame of the sequence of frames, where the second frame comprises a next frame following the first frame in the sequence of frames. The processing system may then generate a first difference vector comprising a difference between a latent space representation of the second frame and a latent space representation of the first frame in response to detecting the correlation between the visual properties, where the latent space representation of the first frame and the latent space representation of the second frame are generated via an autoencoder, and store the first difference vector in a first encoding block.

20 Claims, 6 Drawing Sheets

(56) References Cited

U.S. PATENT DOCUMENTS

2018/0173958 A1    6/2018  Hu et al.
2018/0329884 A1  11/2018  Xiong et al.
2018/0338159 A1  11/2018  Kapoor et al.
2019/0132591 A1*  5/2019  Zhang .................. H04N 19/124

OTHER PUBLICATIONS

"Video Compression Using Recurrent Convolutional Neural Networks", Cedric Yue Sik Kin et al. http://cs231n.stanford.edu/reports/2017/pdfs/423.pdf.

* cited by examiner

VIDEO COMPRESSION WITH GENERATIVE MODELS

The present disclosure relates generally to video compression and transmission, and more particularly to methods, computer-readable media, and devices for creating an encoding block in accordance with latent space representations of video frames generated via an autoencoder, and methods, computer-readable media, and devices for generating a reconstructed version of a frame from a received encoding block via a recurrent neural network.

BACKGROUND

The demand for capacity in wireless networks is expected to increase exponentially. For example, it is predicted that network traffic will be dominated by video transmission with increased usage of video streaming, augmented reality, and surveillance applications. This may make video storage and video transfer a bottleneck for service providers.

SUMMARY

In one example, the present disclosure describes a method, computer-readable medium, and device for creating an encoding block in accordance with latent space representations of video frames generated via an autoencoder. For example, a method may include a processing system having at least one processor obtaining a sequence of frames of a video, and detecting a correlation between visual properties of a first frame of the sequence of frames and a second frame of the sequence of frames, where the second frame comprises a next frame following the first frame in the sequence of frames. The processing system may then generate a first difference vector comprising a difference between a latent space representation of the second frame and a latent space representation of the first frame in response to detecting the correlation between the visual properties, where the latent space representation of the first frame and the latent space representation of the second frame are generated via an autoencoder, and store the first difference vector in a first encoding block.

In another example, the present disclosure describes a method, computer-readable medium, and device for generating a reconstructed version of a frame from a received encoding block via a recurrent neural network. For example, a method may include a processing system having at least one processor receiving at least a first portion of an encoding block associated with a sequence of frames of a video, the at least the first portion of the encoding block including a first frame of the sequence of frames or a latent space representation of the first frame, and a first difference vector comprising a difference between a latent space representation of a second frame of the sequence of frames and the latent space representation of the first frame, where the second frame comprises a next frame following the first frame in the sequence of frames. The processing system may further determine the latent space representation of the second frame from the first difference vector and the latent space representation of the first frame, decode the latent space representation of the second frame into a decoded version of the second frame, apply the decoded version of the second frame and one of the first frame or a reconstructed version of the first frame to a recurrent neural network to generate a reconstructed version of the second frame, and store the reconstructed version of the second frame.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure provides efficient, error resilient methods for video compression and transmission. In particular, examples of the present disclosure include the use of a generative adversarial network (GAN) for creating a receiver-side decoder (e.g., a GAN generator), an autoencoder for converting video frames to compressed latent space representations, where the autoencoder is optimized with respect to the GAN generator, and a receiver-side recurrent neural network (RNN) to improve the quality of reconstructed versions of the video frames. These and other aspects of the present disclosure are described in greater detail below in connection with the examples of FIGS. 1-6.

Figure 1:
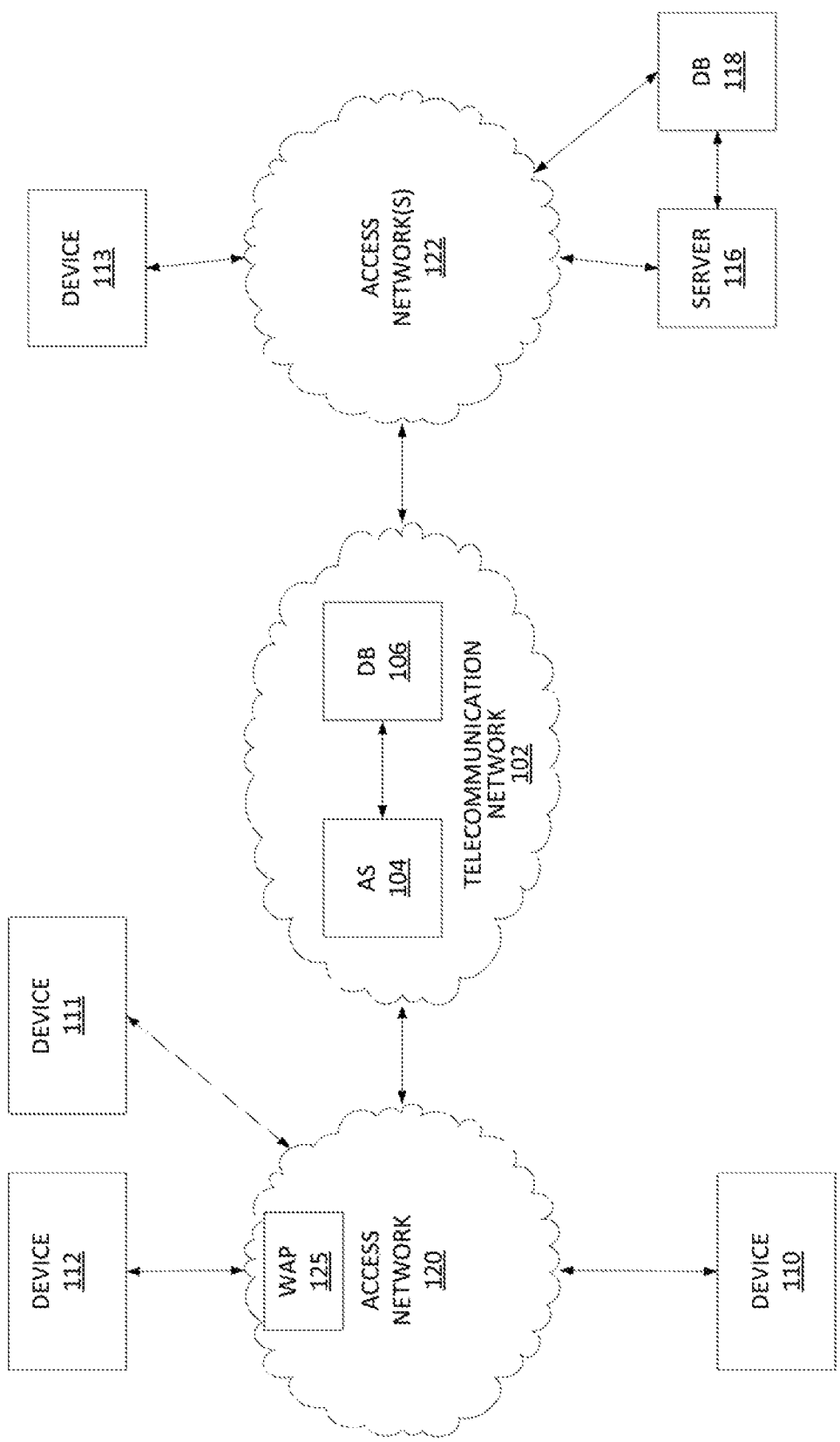
FIG. 1 illustrates an example system related to the present disclosure.

To aid in understanding the present disclosure, FIG. 1 illustrates an example system 100 in which examples of the present disclosure for creating an encoding block in accordance with latent space representations of video frames generated via an autoencoder or for generating a reconstructed version of a frame from a received encoding block via a recurrent neural network may operate. The system 100 may include any one or more types of communication networks, such as a circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a telecommunication network 102. The telecommunication network 102 may be in communication with one or more access networks 120 and 122, and the Internet (not shown). In one example, telecommunication network 102 may combine core network components of a cellular network with components of a triple play service network; where triple-play services include telephone services, Internet services and television services to subscribers. For example, telecommunication network 102 may functionally comprise a fixed mobile convergence (FMC) network, e.g., an IP Multimedia Subsystem (IMS) network. In addition, telecommunication network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication network 102 may further comprise a broadcast television network, e.g., a traditional cable provider network or an Internet Protocol Television (IPTV) network, as well as an Internet Service Provider (ISP) network. In one example, telecommunication network 102 may include a plurality of television (TV) servers (e.g., a broadcast server, a cable head-end), a plurality of content servers, an advertising server, an interactive TV/video on demand (VoD) server, and so forth. For ease of illustration, various additional elements of telecommunication network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an Institute for Electrical and Electronics Engineers (IEEE) 802.11/Wi-Fi network and the like), cellular access networks, $3^{rd}$ party networks, and the like. For example, the operator of telecommunication network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one embodiment, the telecommunication network 102 may be operated by a telecommunication network service provider. The telecommunication network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access networks 120 may be in communication with one or more devices 110-112. Similarly, access networks 122 may be in communication with one or more devices, e.g., device 113. Access networks 120 and 122 may transmit and receive communications between devices 110-113, between devices 110-113, and server 116 and/or database (DB) 118, application server (AS) 104 and/or database (DB) 106, other components of telecommunication network 102, devices reachable via the Internet in general, and so forth. In one example, each of the devices 110-113 may comprise any single device or combination of devices that may comprise a user endpoint device. For example, the devices 110-113 may each comprise a mobile device, a cellular smart phone, a laptop, a tablet computer, a desktop computer, an application server, a bank or cluster of such devices, and the like.

Figure 6:
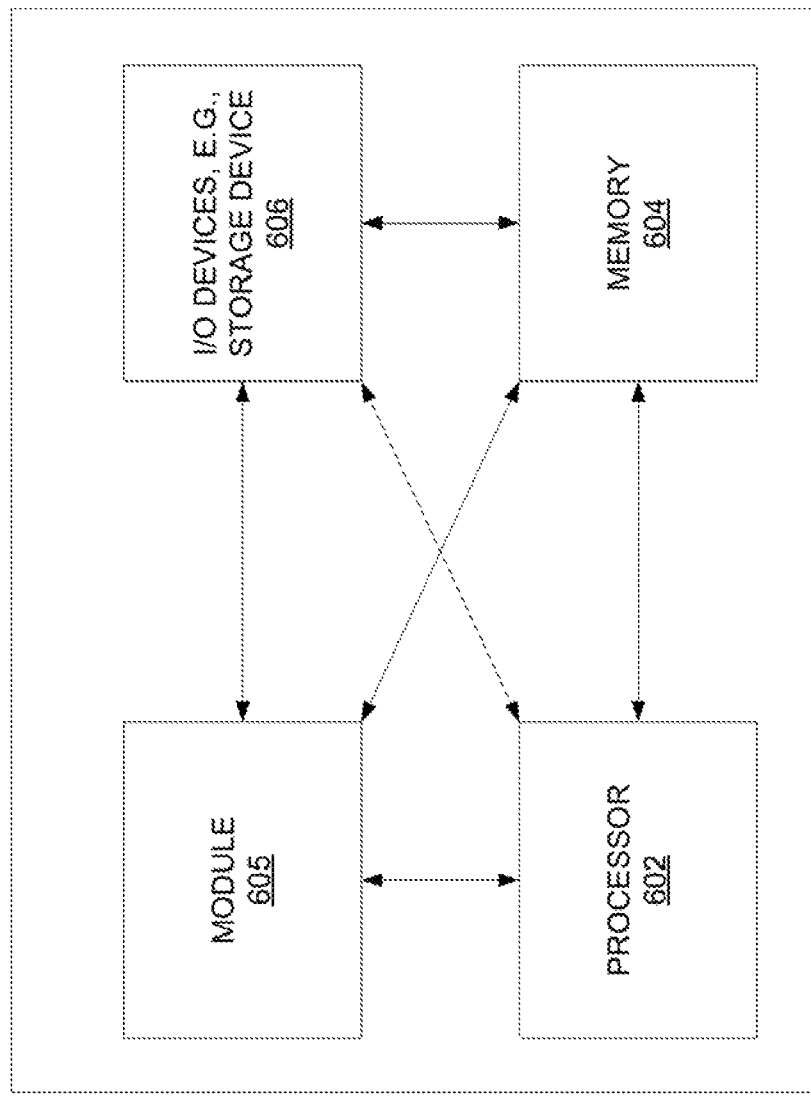
FIG. 6 illustrates a high level block diagram of a computing device specifically programmed to perform the steps, functions, blocks and/or operations described herein.

In one example, devices 110-113 may each comprise programs, logic or instructions for performing functions in connection with examples of the present disclosure for generating a reconstructed version of a frame from a received encoding block via a recurrent neural network. For example, devices 110-113 may each comprise a computing system or device, such as computing system 600 depicted in FIG. 6, and may be configured to provide one or more operations or functions in connection with examples of the present disclosure for generating a reconstructed version of a frame from a received encoding block via a recurrent neural network, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure.

To illustrate, at least one of the devices 110-112 may receive at least a first portion of an encoding block associated with a sequence of frames of a video, the encoding block including a first frame of the sequence of frames or a latent space representation of the first frame and a first difference vector comprising a difference between a latent space representation of a second frame of the sequence of frames and the latent space representation of the first frame (where the second frame comprises a next frame following the first frame in the sequence of frames). The one of the devices 110-113 may then determine the latent space representation of the second frame from the first difference vector and the latent space representation of the first frame and decode the latent space representation of the second frame into a decoded version of the second frame (e.g., where the decoder may comprise a generative adversarial network (GAN) generator).

In addition, in one example, the same or a different one of the devices 110-112 may apply the decoded version of the second frame and one of the first frame or a reconstructed version of the first frame to a recurrent neural network (RNN) to generate a reconstructed version of the second frame and store the reconstructed version of the second frame. For instance, in one example, the present disclosure provides a distributed receiver architecture where several endpoint devices such as devices 110-112 may collectively decode portions of a compressed version of a video, e.g., portions of encoding blocks. For example, access networks 120 may include a wireless access point (WAP) 125, such as a cellular base station, an IEEE 802.11/Wi-Fi access point (e.g., including a wireless router), and so forth. The WAP 125 may broadcast the encoding block which may be received by any of devices 110-112. In addition, devices 110-112 may be assigned different frames of the video program to decode via the GAN generator/decoder and RNN-based architecture for frame reconstruction, where the reconstructed frames may be locally distributed among any of the devices 110-112. The distributed receiver architecture of the present disclosure is described in greater detail below in connection with FIG. 3. In addition, examples of the present disclosure for generating a reconstructed version of a frame from a received encoding block via a recurrent neural network are described in greater detail below in connection with the example method 500 of FIG. 5.

In one example, the access networks 122 may also be in communication with a server 116 and a database (DB) 118. The server 116 and DB 118 may comprise or be associated with, for example, a video hosting and distribution platform. In accordance with the present disclosure, server 116 may comprise a computing system or server, such as computing system 600 depicted in FIG. 6, and may be configured to provide one or more operations or functions for creating an encoding block in accordance with latent space representations of video frames generated via an autoencoder, as described herein. In one example, DB 118 may comprise a physical storage device integrated with server 116 (e.g., a database server), or attached or coupled to the server 116, to store various types of information in support of systems for creating an encoding block in accordance with latent space representations of video frames generated via an autoencoder. For example, DB 118 may store videos or video segments comprising sequences of video frames, compressed versions of videos or video segments in accordance the present disclosure, manifest files which may be provided to devices requesting and/or obtaining videos via server 116, and so forth. DB 118 may also store programs, logic, or instructions that may be executed by server 116 for creating an encoding block in accordance with latent space representations of video frames generated via an autoencoder as described herein.

To illustrate, server 116 may obtain a sequence of frames of a video. The video may be obtained from DB 118, from one of devices 111-113, and so forth. In one example, server 116 may first detect a correlation between visual properties of a first frame of the sequence of frames and a second frame of the sequence of frames, where the second frame comprises a next frame following the first frame in the sequence of frames, generate a first difference vector comprising a difference between a latent space representation of the second frame and a latent space representation of the first frame in response to detecting the correlation between the visual properties, where the latent space representation of the first frame and the latent space representation of the second frame are generated via an autoencoder, and store the first difference vector in a first encoding block. Server 116 may continue to perform similar operations with respect to subsequent frames to add additional difference vectors to the encoding block until it is detected that a subsequent frame is not correlated with a previous frame (e.g., a scene boundary). In addition, server 116 may perform similar operations with respect to additional frames in the same or additional sequences of the video to create additional encoding blocks (e.g., for other scenes). Server 116 may store the generated encoding block(s) as a compressed version of the video, e.g., in DB 118, and/or may transmit the generated encoding block(s) as a compressed version of the video to a device requesting the video (e.g., one of the devices 111-113, to AS 104, or another device or system, such as one or more content distribution network (CDN) servers, and so forth). These and other aspects of the present disclosure are discussed in greater detail below in connection with the examples of FIGS. 2-5.

Although only a single server 116 and a single DB 118 are illustrated, it should be noted that any number of servers 116 or databases 118 may be deployed. In one example, telecommunication network 102 may also include an application server (AS) 104 and a database (DB) 106. In one example, AS 104 may perform the same or similar functions as server 116. Similarly, DB 106 may store the same or similar information as DB 118 (e.g., videos or video segments comprising sequences of video frames, compressed versions of videos or video segments in accordance with the examples of the present disclosure, manifest files which may be provided to devices requesting and/or obtaining videos via AS 104 and/or server 116, etc., programs, logic, or instructions that may be executed by AS 104 and/or server 116 for creating an encoding block in accordance with latent space representations of video frames generated via an autoencoder, and so forth). For instance, in one example, AS 104 may comprise a television server (e.g., a broadcast server, a cable head-end), a content server, an advertising server, an interactive TV/VoD server, and so forth, that is configured to broadcast or otherwise transmit video content that is compressed via the present examples for creating an encoding block in accordance with latent space representations of video frames generated via an autoencoder. Alternatively, or in addition, telecommunication network 102 may provide a video hosting and distribution service to subscribers, e.g., a Hypertext Transfer Protocol (HTTP)-based video hosting and streaming service, in addition to television, phone, and/or other telecommunication services. In one example, AS 104, DB 106, server 116, and/or DB 118 may operate in a distributed and/or coordinated manner to perform various steps, functions, and/or operations described herein.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of telecommunication network 102 and/or access networks 120 and 122 may comprise a content distribution network (CDN) having ingest servers, edge servers, and the like, for packet-based streaming of videos or video segments that may be provided in accordance with the present disclosure. It should also be noted that videos or compressed versions of videos as described herein are not necessarily stored on and transmitted from a single device, but may be stored at and/or transmitted from multiple devices. For instance, different video segments may be stored on different source devices and requested by a player/receiver device from these different source devices, e.g., in accordance with a manifest file indicating where various segments may be obtained. For instance, compressed versions of videos may be stored at and obtained from private and/or public cloud servers, edge cloud servers, CDN servers, and so forth which may comprise dedicated devices and/or host devices running tenant applications, such as virtual machines (VMs), containers, or the like. Similarly, although only two access networks 120 and 122 are shown, in other examples, access networks 120 and/or 122 may each comprise a plurality of different access networks that may interface with telecommunication network 102 independently or in a chained manner. For example, device 114 and server 116 may access telecommunication network 102 via different access networks, devices 110 and 112 may access telecommunication network 102 via different access networks, and so forth. Thus, these and other modifications are all contemplated within the scope of the present disclosure.

As mentioned above, examples of the present disclosure provide an encoder-decoder architecture for video compression and transmission that utilizes a generative adversarial network (GAN), an autoencoder (e.g., a variational autoencoder (VAE)), and a recurrent neural network (RNN). Previous image and video compression algorithms may rely on hand-crafted encoder/decoder pairs (codecs) that may lack adaptability and which are agnostic to the data being compressed. In contrast, generative compression provides for compression of data using generative models, e.g., in accordance with a generative adversarial network (GAN). Generative compression may provide a 10-times or greater compression factor as compared to previous encoding schemes, such as JPEG (Joint Photographic Experts Group). In addition, such previous codecs may use variable-length entropy coding schemes, whereby the transmitted signal is essentially a map key with no preservation of semantic similarity between numerically adjacent signals. In contrast, GAN-based encoding transmits explicit coordinates in a latent space and is therefore more robust against bit errors in the latent space.

Figure 2:
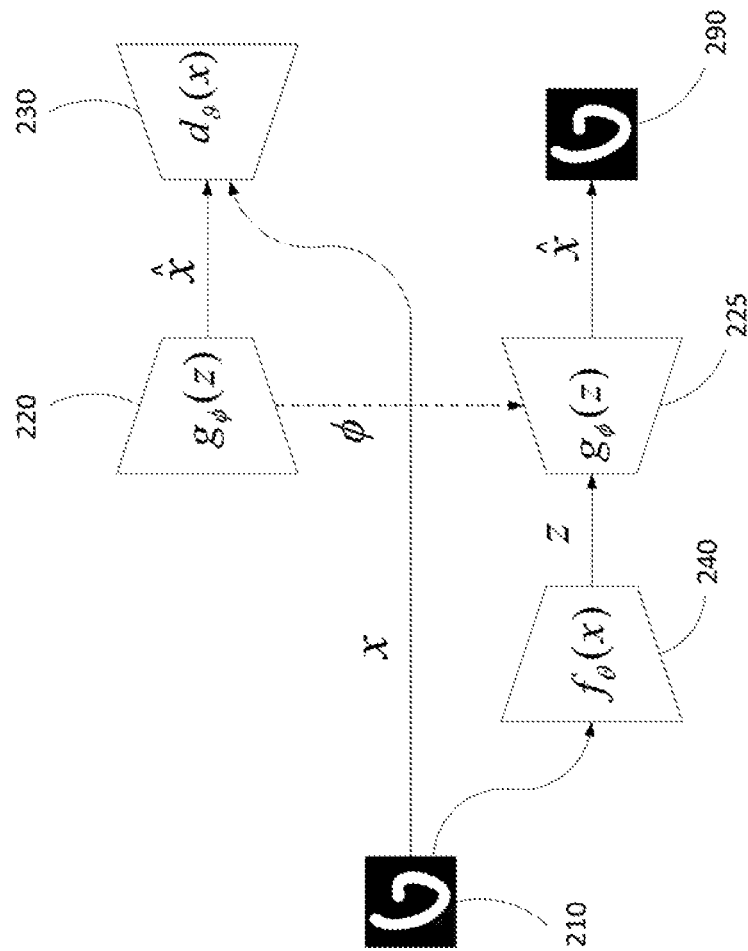
FIG. 2 illustrates an example encoder-decoder system related to the present disclosure.

An example encoder-decoder system 200 is illustrated in FIG. 2. A generative adversarial network (GAN) includes a generator 220 having a generator function (g) for generating random samples that resemble real samples with a twist rendering them as fake samples. The GAN also includes a discriminator 230 having a discriminator function (d) that is tasked with determining if the generated images from the generator function (g) are real or fake. The generator 220 and discriminator 230 are trained to solve a min-max optimization function (e.g., maximize correct classification with respect to the discriminator function (d), minimize correct classification with respect to the generator function (g)). For instance, the min-max optimization problem may be in accordance with Equation 1.

$$E_{x \sim P(x)}[\log d(x)] + E_{z \sim P(z)}[\log(1-d(g(z)))]. \quad \text{Equation 1:}$$

In Equation 1, P(x) is the distribution of the real images and z is the distribution of prior on the latent distribution. In one example, the distribution is taken to be a uniform distribution (U) in the interval [−1,1].

The system 200 further includes an encoder-decoder pair (encoder 240, decoder 225). The encoder 240 converts an image (e.g., image 210) into a vector in latent space z, while the decoder 225, reconstructs the latent space representation/vector back to a reconstructed image 290 in the original space of images (x) via the decoder 225. Based on the GAN architecture, g(z) is defined to be the decoder function of the decoder 225. In other words, decoder 225 may be the same as the trained generator 220.

In the present example, the encoder 240 may map the images, such as image 210 to the latent space (e.g., X→Z). In one example, the encoder 240 is an encoder portion of an autoencoder, e.g., a variational autoencoder (VAE). A VAE includes an auxiliary network to facilitate training. Unlike GANs, the inference function (f) of the VAE is trained to learn an approximation, Q(z|x), of the true posterior, P(z|x), and thus can be used as an encoder for image compression. This is achieved by maximizing the log-likelihood of the data under the generative model in terms of a variational lower bound.

For video compression, the decoder function of decoder 225 g:Z→X (e.g., which is the same as the generator function (g) of generator 220), may be greedily pre-trained using an adversarial loss with respect to the auxiliary discriminator 230, d:X→[0, 1]. For this stage, in one example, the generator 220 and discriminator 230 may be implemented using Deep Convolutional Generative Adversarial Networks (DCGAN)-style convolutional neural networks (ConvNets). Second, the encoder function of encoder 240, f:X→Z, may be trained to minimize distortion loss, L(x, g(f(x))), with respect to the non-adaptive decoder 225 (which is the same as the generator 220), e.g., in accordance with Equation 2.

$$L(x,\hat{x}) = \lambda_1 \|x - \hat{x}\|_2 + \lambda_2 \|\text{conv}_4(x) - \text{conv}_4(\hat{x})\|_2, \quad \text{Equation 2:}$$

In Equation 2, conv4 is the fourth convolutional layer of a convolutional neural network (CNN). For instance, in one example, the encoder 240 may comprise an ImageNet-pre-trained AlexNet. In one example, the fourth convolutional layer is used since this layer contains all or most high-level features of an image for image construction. Thus, the encoder 240 may take an image 210 from an original image space and generate a latent space representation of the image 210 in a latent space. The decoder 225 may take the latent space representation and generate a decoded version 290 of the original image 210. In one example, the generator 220, the discriminator 230, and the encoder 240 may be implemented on a server/encoder/transmit side of a video distribution system. The decoder 225 may be deployed on the receiver side. For instance, multiple copies of the decoder 225 may be deployed on various endpoint devices for video consumption.

The foregoing describes an example of GAN and VAE-based image compression and decoding with respect to individual images which may comprise frames of a video. The present disclosure also provides additional compression with respect to sequences of images/frames. For instance, a transmitter may transmit only every N-th frame, X=[x(t), x(t+N), x(t+2N), . . . ], requiring the receiver to interpolate the missing data with a small N-frame latency. This method may provide storage and/or bandwidth savings, but may result in poor visual quality with pixel-wise interpolation.

In contrast, the present disclosure uses a recurrent neural network (RNN) and a selection method for grouping video frames into blocks/sequences for encoding and/or transmission. To illustrate, it may be first assumed that a number of frames of a video in an uncompressed format is M. In accordance with the present disclosure, a processing system may determine a sequence of frames that are correlated, and may group the frames for encoding and/or transmission as a chunk, which may be referred to herein as an encoding block. In one example, two consecutive frames are considered correlated when the mean square error (MSE) of the pixels of the two consecutive frames is below a threshold. If the two consecutive frames are correlated then the frames are assigned to the same sequence or encoding block S=[x(t), x(t+1), . . . x(t+R)].

In one example, the processing system includes the frame x(t) or a latent space representation z(t) of the frame x(t) at the start of each encoding block. Following the initial frame, the processing system may include a latent vector difference for each subsequence frame. For instance, the latent vector for each frame is z(t)=f(x(t)) and the latent vector difference is the difference in the latent space with respect to the previous frame, δ(t+1)=z(t+1)−z(t). In one example, a compression versus visual quality tradeoff can be controlled by setting the dimensionality of the latent space (where the number of dimensions of the latent space is lower than the original image space). Alternatively, or in addition, the compression versus visual quality tradeoff can be controlled by storing in the encoding block and/or transmitting $\delta(t+1)$ and $\delta(t+\varepsilon)$, and omitting storing and/or transmitting of every $\delta(t+1)$, $\delta(t+2)$ . . . $\delta(t+R)$ vectors, where c is a positive integer less than R. In such an example, $\delta(t+2)$ . . . . $\delta(t+R-1)$ may be linearly interpolated in the latent space. In still another example, the compression versus visual quality tradeoff may be controlled by sending the latent space representation (e.g., the latent vector $z(t)$) for the first frame instead of the original frame/image $x(t)$.

Figure 3:
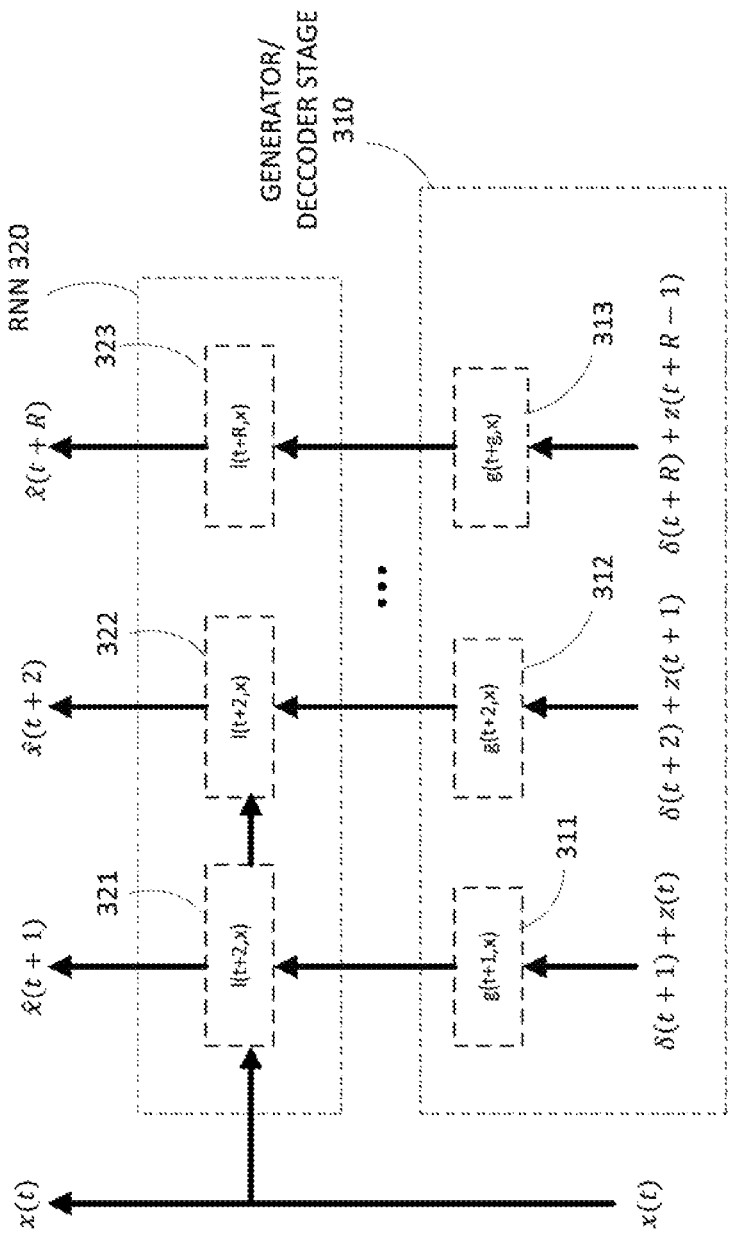
FIG. 3 illustrates an example recurrent neural network (RNN)-based receiver.

Given the composition of the encoding block described above, the job of a receiver is to perform interlocution between the two frames $x(t)$, $x(t+R)$) and estimate $x(t+1)$, . . . $x(t+R-1)$ using $x(t)$, $\delta(t+1)$, $\delta(t+2)$ . . . $\delta(t+R)$ (or using $z(t)$, $\delta(t+1)$, $\delta(t+2)$ . . . $\delta(t+R)$). FIG. 3 illustrates an example of a recurrent neural network (RNN)-based receiver 300 of the present disclosure which includes a generator/decoder stage 310 for decoding latent space representations/vectors into decoded versions of frames in an original image space, and a RNN 320 for generating reconstructed versions of the original frames. In the example of FIG. 3, at each time step, t+i, i>0 (e.g., 311-313) the generator function (g) (which may be the same as in FIG. 2), may convert the latent space representation/vector $z(t+i)=\delta(t+i)+z(t+i-1)$ into an approximate image space representation (e.g., a "decoded version") of the frame/image $x(t+i)$. The generator function (g) of the generator/decoder stage 310 may be trained as described above, e.g., in accordance with Equation 1 and a training data set. In one example, it may be possible to utilize $\hat{x}(t+1)=g(z(t+t))$; without the RNN 320. However, inconstancies are possible with a solely GAN based architecture.

As shown in FIG. 3, RNN 320 includes a plurality of cells 321-323 which may comprise long short-term memory (LSTM) cells/units. Function (I) in each of the cells 321-323 is an interpolation function and may comprise a trained neural network that takes the previous image in the sequence at time $\tau+i-1$, e.g., $x(t+i-1)$) and the approximate image $g(z(t+i))$ to predict the estimate $\hat{x}(t+i)$ of the image at time t+i, which may be referred to herein as a "reconstructed version" of the image/frame. In one example, the RNN 320 is trained using a large set of correlated video frame sequences. Notably, the RNN 320 accounts not only for the previous frame, but all previous frames, and may further minimize reconstruction losses compared to a solely GAN generator-based decoder/receiver architecture.

Examples of the present disclosure further include a distributed receiver architecture. For instance, it is widely accepted that 30 frames per second (fps) or greater provides a reasonable video quality. Thus, for streaming video, one frame should be decoded at the rate of at least 1/30 s or 32 ms on average. In one example, receiver devices, such as users' mobile endpoint devices, customer premises equipment (CPE), etc., may include graphics processing unit (GPU) resources. However, the GPU processing capabilities may be limited and may not be able to maintain the above frame rate. In one example, the receiver-side video decoding of the present disclosure may be performed in a distributed manner, e.g., among several endpoint devices, and may therefore provide decoding and reconstruction of images at a frame rate of 30 fps or greater.

In one example, a group of endpoint devices collectively providing decoder/receiver functions may be referred to a "cohort." For instance, devices 110-112 in FIG. 1 may comprise a cohort. In an illustrative example, the number of nodes/receiver devices in the cohort may be C. The transmitter, e.g., WAP 125 in FIG. 1, may transmit data for a first frame to one or more of the devices 110-112, e.g., via broadcast, multicast, one or more unicast streams, etc. The data for the first frame may comprise the actual image/frame $x(t)$ or a latent space representation/vector $z(t)$. The transmitter may also send differences of latent space changes for the subsequent images ($\delta(t+1)$, $\delta(t+2)$ . . . $\delta(t+R)$). The task of reconstructing a frame for time t+i, $\hat{x}(t+i)$ may be assigned to one of the nodes in the cohort. For instance, the task of reconstructing sequential frames may be assigned in a round robin fashion.

To illustrate a node with index 0 may receive $z(t)$, $\delta(t|1)$, $\delta(t|2)$ . . . $\delta(t-R)$) from the transmitter. It is again noted that in one example, the transmitter may broadcast $\delta(t+1)$, $\delta(t+2)$ . . . $\delta(t+R)$) to all of the nodes in the cohort. However, the index 0 node may first reconstruct the image/frame as $\hat{x}(t)$. The index 0 node may then forward the reconstructed image/frame to the index 1 node (1 mud C). It should be noted that in the RNN-based receiver architecture of FIG. 3, the layers (e.g., LSTM cells) are not independent and therefore require a sequential input. Thus, in one example, each node (e.g., devices 110-113 of FIG. 1) may implement the GAN generator function (g) for a respective time (e.g., 311-313 of FIG. 3) and a respective one of the cells 321-323 of FIG. 3.

More generally, reconstruction of image/frame $\hat{x}(t+i)$ is performed by the node with index i (i mod C). Node (t mod C) may then forward the reconstructed image to (i+1 mod C), and so on. In addition, the reconstructed frames $x(t+1)$, $x(t+2)$ . . . $x(t+R)$ are then transmitted to the node with index 0, which may be the node where the video will actually be played. In one example, it is not necessary to complete reconstruction of the frame $\hat{x}(t+R)$. This frame may be transmitted as the original image or a latent space representation of the original image as a first frame of a next encoding block.

In addition, in one example, the various nodes may share the reconstructed frames among one another such that a plurality or all of the nodes may store and/or present respective reconstructed copies of the video. As illustrated in FIG. 1, the devices 110-112 (e.g., cohort nodes) may communicate directly with one another, e.g., via peer-to-peer communications. Notably, 5G standards may allow device-to-device communications (e.g., group communications). Alternatively, or in addition, unicast device-to-device communications may also be used. In one example, construction of the cohort may also be coordinated via 5G device-to-device signaling. For instance, the cohort may be self-organized by the nodes and/or coordinated by the transmitter or an auxiliary device. In one example, receiver devices may be incentivized to join a cohort by providing a reward or credit. In addition it is noted that for computation stability, the rate of reception of new frames at the receiver device/node with index 0 from the transmitter should be less than total time to reconstruct one frame, including any communication overhead. For instance the rate of reception may be bounded in accordance with Equation 3.

$$\frac{1}{E[R]} < E \sum_{i=0}^{R} T(\text{frame}[i]) \qquad \text{Equation 3}$$

In Equation 3, T(frame[i]) is the amount of time required to reconstruct frame[i] including the communication overhead of transmission from the node with index (t−1 mod C) to the node with index (t mod C). As such, it is noted that several of the parameters mentioned above may be adjusted to provide the appropriate frame rate in view of network and/or wireless channel conditions, the capabilities and numbers of nodes in a cohort, and so forth. For instance, a transmitter/encoding side processing system may select ε, e.g., the number of frames to skip (where the receiver side/cohort may interpolate in the latent space to supply the missing frames). In one example, a transmitter/server/encoding-side processing system may select the number of dimensions of the latent space. As just one example, a network service provider may maintain records of customer premises' processing capabilities (e.g., individual devices or one or more groups of devices/cohorts) and may therefore classify customer premises into capability bands. In addition, several versions of videos encoded at different levels (e.g., with different numbers of latent space dimensions) may be maintained for transmission. Thus, different versions may be transmitted for different customer premises depending upon the network service provider's records regarding the customer premises' capabilities.

Figure 4:
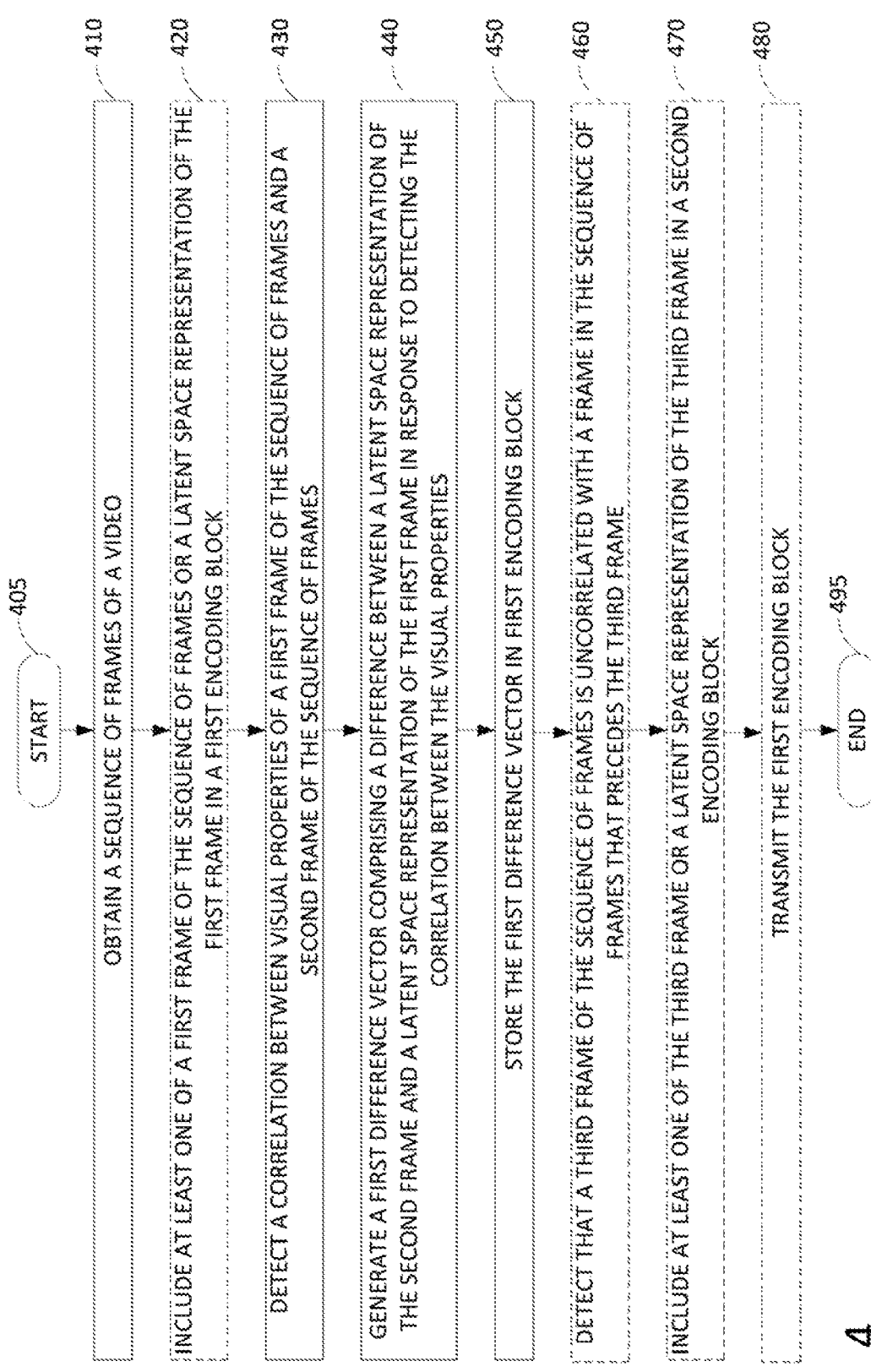
FIG. 4 illustrates a flowchart of an example method for creating an encoding block in accordance with latent space representations of video frames generated via an autoencoder.

FIG. 4 illustrates a flowchart of an example method 400 for creating an encoding block in accordance with latent space representations of video frames generated via an autoencoder. In one example, the method 400 is performed by a component of the system 100 of FIG. 1, such as by one of the server 116, application server 104, and/or any one or more components thereof (e.g., a processor, or processors, performing operations stored in and loaded from a memory), or by one of the server 116 or application server 104, in conjunction with one or more other devices, such as DB 106, DB 118, devices 110-113, and so forth. In one example, the steps, functions, or operations of method 400 may be performed by a computing device or system 600, and/or processor 602 as described in connection with FIG. 6 below. For instance, the computing device or system 600 may represent any one or more components of server 116 and/or application server 104, and so forth in FIG. 1 that is/are configured to perform the steps, functions and/or operations of the method 400. Similarly, in one example, the steps, functions, or operations of method 400 may be performed by a processing system comprising one or more computing devices collectively configured to perform various steps, functions, and/or operations of the method 400. For instance, multiple instances of the computing device or processing system 600 may collectively function as a processing system. For illustrative purposes, the method 400 is described in greater detail below in connection with an example performed by a processing system. The method 400 begins in step 405 and proceeds to step 410.

At step 410, the processing system obtains a sequence of frames of a video.

At optional step 420, the processing system includes at least one of a first frame of the sequence of frames or a latent space representation of the first frame in a first encoding block. For instance, the "first frame" may comprise the initial frame of an encoding block. However, it should be noted that in other examples, the "first frame" may represent any frame within an encoding block and does not necessarily comprise the initial frame.

At step 430, the processing system detects a correlation between visual properties of the first frame of the sequence of frames and a second frame of the sequence of frames, where the second frame comprises a next frame following the first frame in the sequence of frames. In one example, the correlation may be detected when a mean square error (MSE) of the pixels of the two consecutive frames is below a threshold. The threshold may be a configurable parameter that may be selected by an operator of the processing system and/or may be tuned via a human operator or machine learning (ML) with respect to visual quality outcomes, for example. Alternatively, or in addition, step 430 may comprise the processing system applying any number of scene/boundary detection algorithms to determine where one scene ends and the next begins. In other words, step 430 may segregate frames for different encoding blocks based upon scene changes detected via MSE and/or another technique.

At step 440, the processing system generates a first difference vector comprising a difference between a latent space representation of the second frame and a latent space representation of the first frame in response to detecting the correlation between the visual properties. In one example, the latent space representation of the first frame and the latent space representation of the second frame are generated via an autoencoder (e.g., a variational autoencoder (VAE)). In one example, the autoencoder is trained to minimize a distortion loss with respect to a decoder network (e.g., a generator) trained via a discriminator of a generative adversarial network (GAN) (e.g., in accordance with Equation 2 above). It is again noted that the decoder network may comprise a generator of the GAN. In one example, the latent space representation of the first frame, the latent space representation of the second frame, and the first difference vector are associated with a latent space having fewer dimensions that a feature space of the sequence of frames of the video. For instance, the GAN generator and discriminator, and the autoencoder may be trained with respect to a latent space having a selected number of dimensions that is less that the number of dimensions of the original image space.

At step 450, the processing system stores the first difference vector in the first encoding block. For instance, the first encoding block may include the at least one of the first frame or a latent space representation of the first frame (e.g., from optional step 420), the first difference vector, and a sequence of difference vectors, each difference vector of the sequence of difference vectors comprising a difference between latent space representations of a pair of adjacent frames in the sequence of frames of the video. In one example, the sequence of difference vectors includes adjacent difference vectors associated with non-sequential pairs of adjacent frames in the sequence of frames of the video. In other words, the processing system may omit a plurality of difference vectors of the sequence of difference vectors at selected intervals. For instance, this may be a parameter that is tuned to provide a bandwidth/storage versus quality tradeoff (e.g., parameter c above).

At optional step 460, the processing system may detect that a third frame of the sequence of frames is uncorrelated with a frame in the sequence of frames that precedes the third frame, where the frame that precedes the third frame is included in the encoding block. For instance, the frame that precedes the third frame may be the second frame or another frame (e.g., a "fourth" frame) may immediately precede the third frame (e.g., optional step 460 may pertain to a "third" frame that is not consecutive to the second frame). Optional step 460 may include determining that the MSE between the third frame and the preceding frame is greater than the threshold mentioned above in connection with step 430 and/or may comprise the detection of a scene boundary in accordance with any number of scene/boundary detection algorithms.

At optional step 470, the processing system may include at least one of the third frame or a latent space representation of the third frame in a second encoding block. For instance, the third frame is not included in the first encoding block.

Rather, the third frame may be the first frame in a next encoding block (the second encoding block) after the first encoding block. For instance, the third frame may be detected to be the beginning of a new scene.

At optional step 480, the processing system may transmit the first encoding block. In one example, step 480 may include a wireless broadcast of the first encoding block, e.g., via a wireless access point (WAP), such as a cellular base station, an IEEE 802.11 wireless router, etc. Following step 450, or any of optional steps 460-480 the method 400 proceeds to step 495 where the method 400 ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400 by continuing to populate the second encoding block with difference vectors, detecting a new scene and starting a third encoding block, and so on. In another example, the method 400 may be expanded to include transmitting the second encoding block. In another example, the "first frame" may not be the initial frame of the first encoding block. In such case, optional step 420 may be modified to comprise sending a difference vector between the first frame and an adjacent frame preceding the first frame. In still another example, the method 400 may be repeated and may additionally include skipping frames at iterations of step 440 (e.g., to save storage and/or transmission resources and allowing the receiver to interpolate missing frames in the latent space). In still another example, the method 400 may be modified to send the original image (x) or a latent space representation/vector (z) of an intermediate frame of an encoding block, and then encoding the preceding and following frames as difference vectors with respect to this intermediate frame that is used as a reference. Thus, these and other modifications are all contemplated within the scope of the present disclosure.

Figure 5:
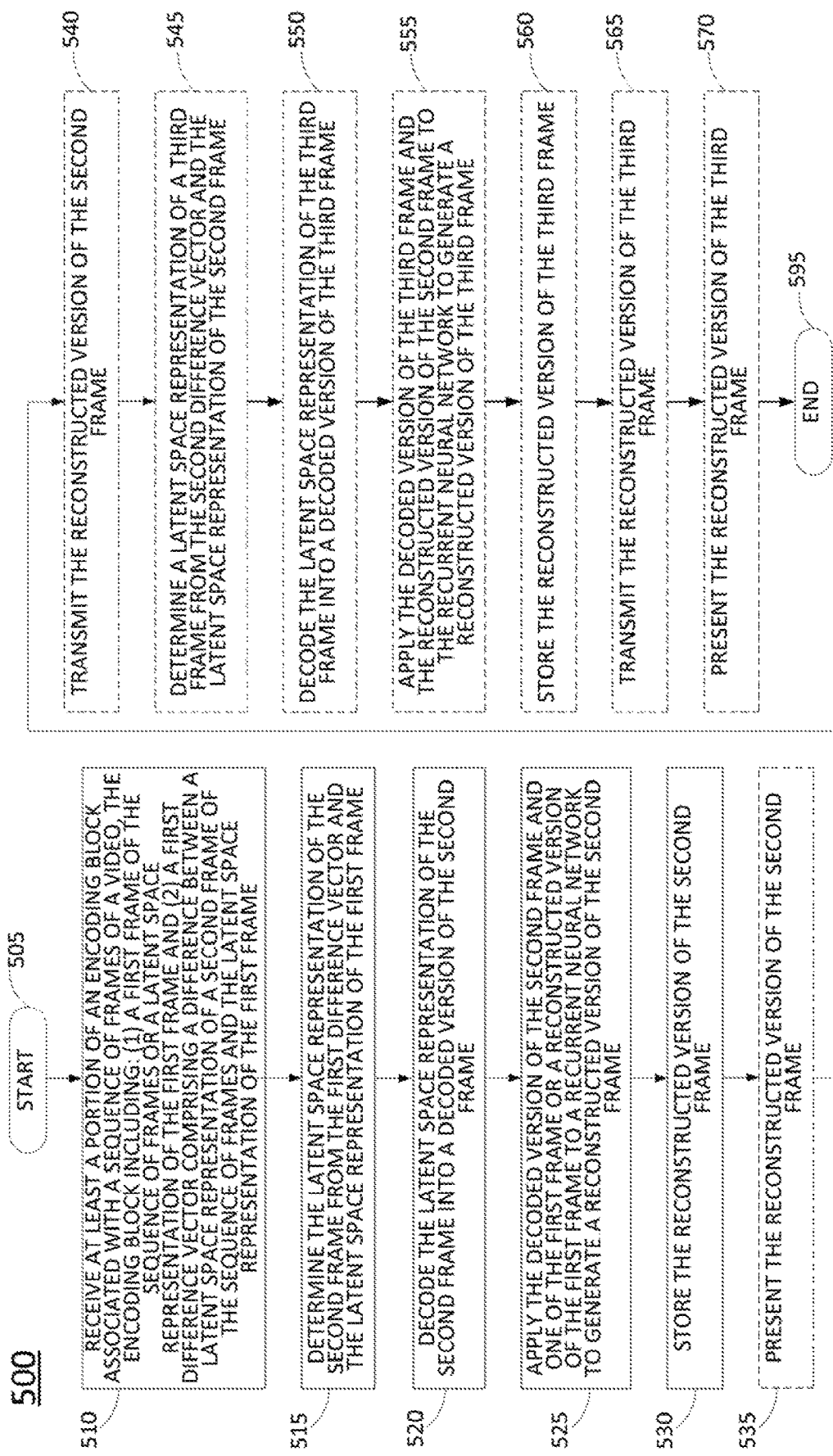
FIG. 5 illustrates a flowchart of an example method for generating a reconstructed version of a frame from a received encoding block via a recurrent neural network.

FIG. 5 illustrates a flowchart of an example method 500 for generating a reconstructed version of a frame from a received encoding block via a recurrent neural network, in accordance with the present disclosure. In one example, the method 500 is performed by a component of the system 100 of FIG. 1, such as by one of the devices 110-112, and/or any one or more components thereof (e.g., a processor, or processors, including CPU(s), GPU(s), or a combination thereof performing operations stored in and loaded from a memory), or by a group of devices, such as devices 110-113 in a "cohort," and so forth. In one example, the steps, functions, or operations of method 500 may be performed by a computing device or system 600, and/or processor 602 as described in connection with FIG. 6 below. For instance, the computing device or system 600 may represent any one or more components of the device(s) 110-113 or the like in FIG. 1 that is/are configured to perform the steps, functions and/or operations of the method 500. Similarly, in one example, the steps, functions, or operations of method 500 may be performed by a processing system comprising one or more computing devices collectively configured to perform various steps, functions, and/or operations of the method 500. For instance, multiple instances of the computing device or processing system 600 may collectively function as a processing system. For illustrative purposes, the method 500 is described in greater detail below in connection with an example performed by a processing system. The method 500 begins in step 505 and proceeds to step 510.

At step 510, the processing system receives at least a first portion of an encoding block associated with a sequence of frames of a video. The at least the first portion of the encoding block may include: (1) a first frame of the sequence of frames or a latent space representation of the first frame, and (2) a first difference vector comprising a difference between a latent space representation of a second frame of the sequence of frames and the latent space representation of the first frame (where the second frame is the next frame following the first frame in the sequence of frames).

At step 515, the processing system determines the latent space representation of the second frame from the first difference vector and the latent space representation of the first frame. In one example, the latent space representation of the first frame, the latent space representation of the second frame, and the first difference vector are associated with a latent space having fewer dimensions that a feature space of the sequence of frames of the video (the original image space). In an example where the first frame (e.g., the original image) is received, the processing system may first encode the first frame into the latent space representation of the first frame. For instance, the processing system (receiver-side) may include an encoder (e.g., of a trained VAE) similar to the transmitter/encoder side.

At step 520, the processing system decodes the latent space representation of the second frame into a decoded version of the second frame. In one example, the decoding is via a generator of a generative adversarial network (GAN). For instance, the generator may be trained with a discriminator in accordance with Equation 1 above.

At step 525, the processing system applies the decoded version of the second frame and one of the first frame or a reconstructed version of the first frame to a recurrent neural network (RNN) to generate a reconstructed version of the second frame. The first frame may be used in an example where the first frame is sent by the transmitter and received at step 510. Otherwise, a reconstructed version of the first frame may be used at step 525. For instance, it may be assumed that this reconstructed version may have been generated by the processing system in connection with step 515. In one example, the RNN comprises a plurality of long short-term memory (LSTM) units/cells.

At step 530, the processing system stores the reconstructed version of the second frame. It should be noted that in the present example, storing may include writing the reconstructed version to a storage unit (e.g., a hard disk), maintaining the reconstructed version in a memory, e.g., in a video buffer for presentation in the near-term and/or for transmission among two or more peer receiver devices in a cohort, and so forth.

At optional step 535, the processing system may present the reconstructed version of the second frame. For instance, the processing system may be receiving the video for streaming video consumption and may present frames as they are decoded, e.g., as fast as the processing system can perform the decoding and/or with a short buffer.

At optional step 540, the processing system may transmit the reconstructed version of the second frame. For instance, as described above, a distributed GAN and RNN-based receiver architecture may be used. As such, the processing system may comprise at least a first receiver device that may perform steps 510-540 and that may also transmit the reconstructed version of the second frame to one or more other receiver devices of the processing system, e.g., for storage, playback, and/or further processing on the respective receiver device(s). In one example, at least one of the other receiver devices may obtain the reconstructed version of the second frame to be used as one of the inputs to a LSTM cell of the RNN, e.g., to create a reconstructed version of a third frame that follows the second frame in the sequence of frames.

At optional step 545, the processing system may determine a latent space representation of a third frame from a second difference vector and the latent space representation of the second frame. For instance, the encoding block may further include a second difference vector comprising a difference between a latent space representation of a third frame of the sequence of frames and the latent space representation of the second frame, where the third frame is a next frame following the second frame in the sequence of frames. It should be noted that the second difference vector may be received with the at least the first portion of the encoding block at step 510, or may be separately received, e.g., in at least a second portion of the encoding block that may be separately transmitted. In one example, optional step 545 may comprise operations similar to that which is described above in connection with step 515.

At optional step 550, the processing system may decode the latent space representation of the third frame into a decoded version of the third frame. For instance, optional step 550 may comprise operations similar to that which is described above in connection with step 520.

At optional step 555, the processing system may apply the decoded version of the third frame and the reconstructed version of the second frame to the RNN to generate a reconstructed version of the third frame. For instance, optional step 555 may comprise operations similar to that which is described above in connection with step 525. However, optional step 555 may be associated with a different LSTM unit/cell of the RNN. In addition, in one example, optional steps 545-555 (and step 560) may be performed at a different receiver device of the processing system than a receiver device that may perform the preceding operations of the method 500.

At optional step 560, the processing system may store the reconstructed version of the third frame. For instance, optional step 560 may comprise operations similar to that which is described above in connection with step 530.

At optional step 565, the processing system may transmit the reconstructed version of the third frame. For instance, optional step 565 may comprise operations similar to that which is described above in connection with optional step 540. For example, step 565 may comprise transmission of the reconstructed version of the third frame among two or more peer receiver devices in a cohort.

At optional step 570, the processing system may present the reconstructed version of the third frame. For instance, optional step 570 may comprise operations similar to that which is described above in connection with optional step 535. Following step 530 or any of optional step 535-570, the method 500 proceeds to step 595 where the method 500 ends.

It should be noted that the method 500 may be expanded to include additional steps, or may be modified to replace steps with different steps, to combine steps, to omit steps, to perform steps in a different order, and so forth. For instance, in one example the processing system may repeat one or more steps of the method 500, such as optional steps 545-570 with respect to additional frames of the encoding block, steps 510-530, or step 510 to optional step 570 with respect to additional encoding blocks, and so forth. In one example, the method 500 may further include operations to interpolate missing frames in the latent space. For instance, in one example, a transmitter may send encoding blocks with information missing for certain frames, where the processing system (the receiver-side) is expected to interpolate in the latent space from latent space representations/vectors of the preceding and/or the following frames. Thus, these and other modifications are all contemplated within the scope of the present disclosure.

In addition, although not expressly specified above, one or more steps of the method 400 or the method 500 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIGS. 4 and 5 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure. FIG. 6 depicts a high-level block diagram of a computing device or processing system specifically programmed to perform the functions described herein. For example, any one or more components or devices illustrated in FIG. 1 or described in connection with the example methods 400 and 500 may be implemented as the processing system 600. As depicted in FIG. 6, the processing system 600 comprises one or more hardware processor elements 602 (e.g., a microprocessor, a central processing unit (CPU) and the like), a memory 604, (e.g., random access memory (RAM), read only memory (ROM), a disk drive, an optical drive, a magnetic drive, and/or a Universal Serial Bus (USB) drive), a module 605 for creating an encoding block in accordance with latent space representations of video frames generated via an autoencoder and/or for generating a reconstructed version of a frame from a received encoding block via a recurrent neural network, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 602 can also be configured or programmed to cause other devices to perform one or more operations as discussed above. In other words, the hardware processor 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 605 for creating an encoding block in accordance with latent space representations of video frames generated via an autoencoder and/or for generating a reconstructed version of a frame from a received encoding block via a recurrent neural network (e.g., a software program comprising computer-executable instructions) can be loaded into memory 604 and executed by hardware processor element 602 to implement the steps, functions or operations as discussed above in connection with the example methods 400 and 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for creating an encoding block in accordance with latent space representations of video frames generated via an autoencoder and/or for generating a reconstructed version of a frame from a received encoding block via a recurrent neural network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    obtaining, by a processing system including at least one processor, a sequence of frames of a video, wherein each frame of the sequence of frames is associated with a feature space;
    detecting, by the processing system, a correlation between visual properties of a first frame of the sequence of frames and a second frame of the sequence of frames, wherein the second frame comprises a next frame following the first frame in the sequence of frames, wherein the first frame and the second frame are correlated as a first encoding block when an error measure between the first frame and the second frame is below a threshold;
    generating, by the processing system, a first difference vector comprising a difference between a latent space representation of the second frame and a latent space representation of the first frame in response to the detecting the correlation between the visual properties, wherein the latent space representation of the first frame and the latent space representation of the second frame are generated via an autoencoder, wherein the latent space representation of the first frame and the latent space representation of second frame are associated with a latent space comprising a number of dimensions of the latent space that is lower than the feature space; and
    storing, by the processing system, the first difference vector in the first encoding block.

2. The method of claim 1, wherein the autoencoder is trained to minimize a distortion loss with respect to a decoder network trained via a discriminator of a generative adversarial network.

3. The method of claim 2, wherein the decoder network comprises a generator of the generative adversarial network.

4. The method of claim 1, further comprising:
    including at least one of the first frame or the latent space representation of the first frame in the first encoding block.

5. The method of claim 1, further comprising:
    detecting that a third frame of the sequence of frames is uncorrelated with a frame in the sequence of frames that precedes the third frame, wherein the frame that precedes the third frame is included in the first encoding block.

6. The method of claim 5, further comprising:
    including at least one of the third frame or a latent space representation of the third frame in a second encoding block.

7. The method of claim 1, wherein the latent space representation of the first frame, the latent space representation of the second frame, and the first difference vector are associated with the latent space comprising the number of dimensions of the latent space that is lower than the feature space of the sequence of frames of the video.

8. The method of claim 1, wherein the first encoding block comprises the at least one of the first frame or the latent space representation of the first frame, the first difference vector, and a sequence of difference vectors, each difference vector of the sequence of difference vectors comprising a difference between latent space representations of a pair of adjacent frames in the sequence of frames of the video.

9. The method of claim 8, wherein the sequence of difference vectors includes adjacent difference vectors associated with non-sequential pairs of adjacent frames in the sequence of frames of the video.

10. The method of claim 1, further comprising:
    transmitting the first encoding block.

11. A non-transitory computer-readable medium storing instructions which, when executed by a processing system including at least one processor, cause the processing system to perform operations, the operations comprising:
    obtaining a sequence of frames of a video, wherein each frame of the sequence of frames is associated with a feature space;

detecting a correlation between visual properties of a first frame of the sequence of frames and a second frame of the sequence of frames, wherein the second frame comprises a next frame following the first frame in the sequence of frames, wherein the first frame and the second frame are correlated as a first encoding block when an error measure between the first frame and the second frame is below a threshold;

generating a first difference vector comprising a difference between a latent space representation of the second frame and a latent space representation of the first frame in response to the detecting the correlation between the visual properties, wherein the latent space representation of the first frame and the latent space representation of the second frame are generated via an autoencoder, wherein the latent space representation of the first frame and the latent space representation of second frame are associated with a latent space comprising a number of dimensions of the latent space that is lower than the feature space; and storing the first difference vector in the first encoding block.

12. A method comprising:

receiving, by a processor, at least a first portion of a first encoding block associated with a sequence of frames of a video, wherein each frame of the sequence of frames is associated with a feature space, the at least the first portion of the first encoding block including:
 a first frame of the sequence of frames or a latent space representation of the first frame; and
 a first difference vector comprising a difference between a latent space representation of a second frame of the sequence of frames and the latent space representation of the first frame, wherein the second frame comprises a next frame following the first frame in the sequence of frames, wherein the first frame and the second frame are correlated as the first encoding block when an error measure between the first frame and the second frame is below a threshold, wherein the latent space representation of the first frame and the latent space representation of second frame are associated with a latent space comprising a number of dimensions of the latent space that is lower than the feature space;

determining, by the processor, the latent space representation of the second frame from the first difference vector and the latent space representation of the first frame;

decoding, by the processor, the latent space representation of the second frame into a decoded version of the second frame;

applying, by the processor, the decoded version of the second frame and one of the first frame or a reconstructed version of the first frame to a recurrent neural network to generate a reconstructed version of the second frame; and storing, by the processor, the reconstructed version of the second frame.

13. The method of claim 12, further comprising:

presenting the reconstructed version of the second frame.

14. The method of claim 12, further comprising:

transmitting the reconstructed version of the second frame.

15. The method of claim 12, wherein the decoding is via a generator of a generative adversarial network.

16. The method of claim 12, wherein the latent space representation of the first frame, the latent space representation of the second frame, and the first difference vector are associated with the latent space comprising the number of dimensions of the latent space that is lower than the feature space of the sequence of frames of the video.

17. The method of claim 12, wherein the recurrent neural network comprises a plurality of long short-term memory units.

18. The method of claim 12, wherein the first encoding block further includes:
 a second difference vector comprising a difference between a latent space representation of a third frame of the sequence of frames and the latent space representation of the second frame, wherein the third frame comprises a next frame following the second frame in the sequence of frames.

19. The method of claim 18, further comprising:

determining the latent space representation of the third frame from the second difference vector and the latent space representation of the second frame;

decoding the latent space representation of the third frame into a decoded version of the third frame;

applying the decoded version of the third frame and the reconstructed version of the second frame to the recurrent neural network to generate a reconstructed version of the third frame; and storing the reconstructed version of the third frame.

20. The method of claim 19, further comprising at least one of:

presenting the reconstructed version of the third frame; or transmitting the reconstructed version of the third frame.

* * * * *